United States Patent
Verma et al.

(10) Patent No.: US 10,289,780 B1
(45) Date of Patent: May 14, 2019

(54) SYSTEMS AND METHODS FOR PERFORMING ELECTROMIGRATION AND VOLTAGE DROP VERIFICATION IN ELECTRONIC CIRCUIT DESIGNS

(71) Applicant: CADENCE DESIGN SYSTEMS, INC., San Jose, CA (US)

(72) Inventors: Babita C. Verma, New Delhi (IN); Parveen Khurana, Delhi (IN); Sanjeev Azad, Haryana (IN); Xin Gu, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/585,075

(22) Filed: May 2, 2017

(51) Int. Cl.
*G06F 17/50* (2006.01)

(52) U.S. Cl.
CPC .................. *G06F 17/504* (2013.01)

(58) Field of Classification Search
USPC ................................................ 716/100–109
See application file for complete search history.

(56) References Cited

U.S. PATENT DOCUMENTS

| | | | | |
|---|---|---|---|---|
| 2003/0014201 A1* | 1/2003 | Schultz | ............... | G06F 17/5036 702/64 |
| 2015/0143317 A1* | 5/2015 | Gibson | ............... | G06F 17/5036 716/115 |
| 2017/0116367 A1* | 4/2017 | Bickford | ............. | G06F 17/5081 |

* cited by examiner

*Primary Examiner* — Binh C Tat
(74) *Attorney, Agent, or Firm* — Eric L. Sophir; Dentons US LLP

(57) ABSTRACT

Disclosed herein are systems and methods to perform electrical analysis of a circuit design to verify electrical behavior and performance of the circuit design in a two-step process. Initially, a simulator transient analysis is performed on circuit blocks of a circuit design to obtain a current through each device path in each circuit block, and using the current obtained the IR drop and EM problems are examined to get EM-IR drop analysis. Next, a simulator transient analysis is performed on a top level circuit of a circuit design and current values generated in a first step to obtain EM-IR drop analysis for a full circuit design such that a circuit designer may debug, analyze and visualize various IR and EM value plots for circuit blocks and top level circuit of the circuit design together or separately.

20 Claims, 4 Drawing Sheets

SYSTEMS AND METHODS FOR PERFORMING ELECTROMIGRATION AND VOLTAGE DROP VERIFICATION IN ELECTRONIC CIRCUIT DESIGNS

TECHNICAL FIELD

This application generally relates to field of electronic circuit designs, and more specifically relates to methods and systems for power analysis and power verification of hierarchical electronic circuit designs.

BACKGROUND

Electronic circuits, such as integrated circuits or chips, are used in most products that have electronic components. A typical integrated circuit (IC) design is initially conceived by a circuit designer, with a number of components and devices connected to generate a circuit with desired performance and characteristics. Once the circuit designer has designed an electronic circuit, the circuit is reconfigured from the schematic format into a geometric layout format specifying a suitable semiconductor implementation of the circuit.

A large number of components in the IC may be facilitated with an electronic design automation (EDA) tool that allows a circuit designer to position and connect various shapes on the IC. The circuit designer can create a custom design of such ICs, printed-circuit boards, and other electronic circuits containing the physical locations and dimensions of the circuit's components, interconnections, and various layers from the original design that may then be fabricated using EDA technologies that typically run on an operating system in conjunction with a processor-based computer system.

Circuit designers may use different methods to verify the functionality and power consumption of the generated electronic circuit designs. One common method of verifying is to simulate the designed electronic circuit. Simulating a circuit design dynamically verifies the circuit design by monitoring behaviors of the design, often under controlled parameters. For many types of circuit designs, simulation can be performed during the design process to ensure that the ultimate functionality will be achieved by the fabricated circuit. Therefore, an exploding demand for high performance electronic products has increased the interest in efficient and accurate simulation techniques for integrated circuits. For analog designs, an analog-based simulation approach is commonly used to implement simulation of the design, and for digital circuits, equivalent digital simulation is performed.

The primary goal of the computer-aided design simulations is to verify the electrical characteristics of a circuit design. The electrical characteristics of a circuit design may be significantly impacted by physical dimensions such as, gate oxide thickness, gate width, length, shape of the poly gate at the bottom, and spacer width. Current semiconductor fabrication techniques have advanced to create fairly simple geometrical shapes for these dimensional features. As a result, simple geometrical rules may be sufficient for these critical dimensions within the circuit design. However, as circuit design dimensions continue to shrink, semiconductor fabrication processes or techniques require more complex techniques to meet the design goals. Because of this shrinking in the circuit design dimensions and increase in the circuit design complexities, the electric properties of wires have become more prominent, and chips are more susceptive to breakdown due to, for example, antenna effect or to wear out over time due to, for example, electromigration (EM). Accordingly, in order to ensure the proper operation of the circuit design, there are many types of electrical analyses that are needed to be performed to check for potential problems relating to EM effects and voltage (IR) drops.

As the modern day circuit designs comprise several millions of instances of circuit devices, current computer-aided simulation and analysis techniques being employed on the circuit designs to check for potential problems relating to IR drops and EM effect use a lot of computing power and have a large runtime. For example, a conventional computer-aided flat simulation technique employed on a large size circuit design considers the circuit design as a flat design with no top level and block level boundaries. Such flat simulation method merges both top level and block level netlists, and then the merged top level and block level netlists are simulated together as one single netlist. In this flat simulation technique, operational performance and capacity becomes a huge bottleneck as the circuit design increase in size and complexity due to simulating the combined top level and block level netlists. Also, the flat simulation method doesn't provide any technique to view and analyze EM and IR values determined for the block level and the top level separately, and thereby imposing a challenge when a circuit designer wants to debug and fix the EM and IR issues for the block level and the top level of the circuit design individually.

In another example, a conventional computer-aided simulation technique employed on a large size electronic circuit design initially employs a block level macro modeling to create a single resistance and capacitance (RC) model for a full block, and then attach a full block current to a single pin. Such block models are then used in a top level simulation run as black box. This black box modeling of the blocks of the circuit design in simulation of the top design of the circuit design does not provide accurate power-grid EM and IR results as that requires distributed current model across a power-grid network inside the block level of the circuit design. Also, this simulation method doesn't provide any technique to view and analyze the EM and IR values determined for the block level, and thereby imposing a challenge when a circuit designer wants to debug and fix the EM and IR issues of the circuit design.

Therefore, there is a need for methods and systems that addresses the above mentioned drawbacks of the conventional techniques employed for simulation of increasingly large and complex circuit designs to achieve high performance with comparative accuracy while simulating large size circuit designs, and thereby allowing the EM and IR sign-off for large and complex electronic circuit designs.

SUMMARY

Methods and systems disclosed herein attempt to address the above issues corresponding to operational performance of conventional simulation methods, and may provide a number of other benefits as well. Method and systems disclosed herein are directed to a technique for performing EM-IR drop analysis on electronic circuit designs comprising analog designs, analog/mixed-signal (AMS) designs, and custom digital designs of large sizes. The electronic circuit design may include an integrated circuit hierarchy which may be traversed from a top design level to a bottom design level comprising circuit blocks. The EM-IR drop analysis of the integrated circuit may be performed by the methods and the systems described herein such that a circuit designer may debug, analyze and visualize various IR and EM value plots for circuit block and top level circuit of the integrated circuit together or separately.

In one embodiment, a computer-implemented method for performing electromigration and voltage drop verification of a circuit design includes receiving, by a computer, design data for the circuit design from a non-transitory machine-readable media. The design data may include full-chip information for the circuit design having one or more circuit blocks and a top level circuit. The computer-implemented method further includes simulating, by the computer, an initial block netlist of each of the one or more circuit blocks to determine current values for respective power and signal nets associated with a plurality of transistors in each of the one or more circuit blocks. Each respective initial block netlist comprises a plurality of records of a plurality of transistors and a plurality of nets interconnecting the plurality of transistors within each circuit block. The computer-implemented method further includes generating, by the computer, a block current file for each of the one or more circuit blocks where a respective block current file for a circuit block contains database records indicate the current values for the respective power and signal nets associated with the plurality of transistors in the respective circuit block. The computer-implemented method further includes determining, by the computer, voltage drop values across the respective power and signal nets for the plurality of transistors in the respective circuit block based upon the current values determined for the respective power and signal nets for the plurality of transistors in the respective circuit block. The computer-implemented method further includes generating, by the computer, a power grid view file for each of the one or more circuit blocks based upon the current values and voltage values across the power and signal nets associated with the plurality of transistors in the respective circuit block. In response to the computer receiving one or more instructions to simulate the top level circuit, the computer-implemented method further includes determining, by the computer, a plurality of interface nodes connecting the circuit blocks to the top level circuit based upon the respective power grid file; and rendering, by the computer, a graphical user interface (GUI) displaying a top level circuit simulation based on a top level netlist of the top level circuit, the plurality of interface nodes connecting the circuit blocks to the top level circuit, and the block current files for the circuit blocks.

In another embodiment, a system for performing electromigration and voltage drop verification of a circuit design is disclosed. The system may include a non-transitory machine-readable media configured to store the circuit design and a computer coupled to the non-transitory machine readable media storing the circuit design and comprising a processor. The processor is configured to receive design data for the circuit design from the non-transitory machine-readable media where the design data comprises full-chip information for the circuit design having one or more circuit blocks and a top level circuit. The processor is further configured to determine current values for respective power and signal nets associated with a plurality of transistors in each of the one or more circuit blocks by simulating an initial block netlist of each of the one or more circuit blocks to determine current values for respective power and signal nets associated with a plurality of transistors in each of the one or more circuit blocks. The processor is further configured to generate a block current file for each of the one or more circuit blocks where a respective block current file for a circuit block contains database records indicating the current values for the respective power and signal nets associated with the plurality of transistors in the respective circuit block. The processor is further configured to determine voltage drop values across the respective power and signal nets for the plurality of transistors in the respective circuit block based upon the current values determined for the respective power and signal nets for the plurality of transistors in the respective circuit block. The processor is further configured to generate a power grid view file for each of the one or more circuit blocks based upon the current values and voltage values across the power and signal nets associated with the plurality of transistors in the respective circuit block. In response to the computer receiving one or more instructions to simulate the top level circuit, the processor is further configured to determine a plurality of interface nodes connecting the circuit blocks to the top level circuit based upon the respective power grid file, and render a graphical user interface (GUI) displaying a top level circuit simulation based on a top level netlist of the top level circuit, the plurality of interface nodes connecting the circuit blocks to the top level circuit, and the block current files for the circuit blocks.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
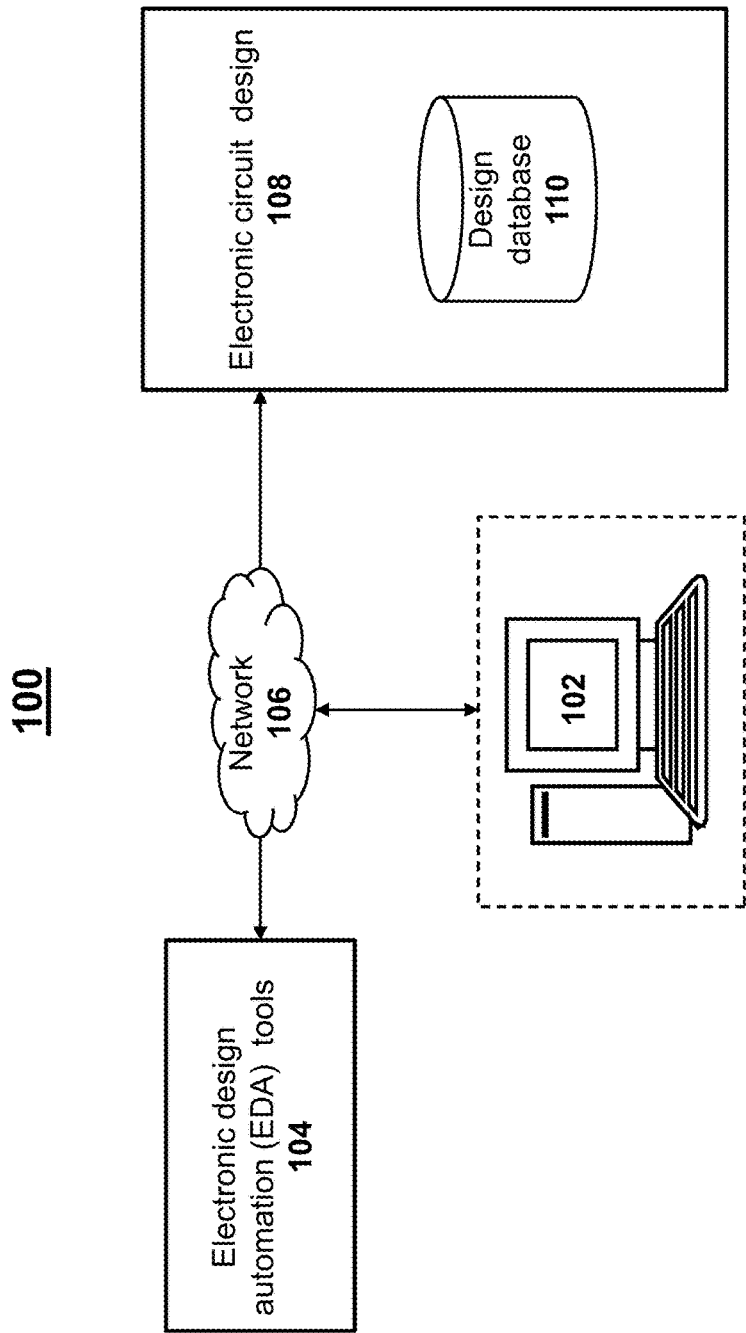
FIG. 1 is a schematic diagram illustrating a system for performing electrical analysis on an electronic circuit design, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments described herein include methods and systems for analysis and simulation of electronic circuit designs. The methods and systems may be implemented in electronic design automated (EDA) technologies, such as a custom Integrated Circuit (IC) design system having a graphical user interface or a layout editor running program code to assist a circuit designer to generate, implement, and optimize customized electronic circuit designs. Although the present disclosure can be implemented to run with custom design systems, it is understood that the present disclosure is not limited thereto and may also be implemented with other known or later developed EDA technologies capable of generating and manipulating various electronic circuit devices to generate and optimize electronic design layout.

An EDA layout software and computing devices may access a design database hosted on one or more computing devices configured to store records of the design elements of the electronic circuit design. The design database may enforce a standard data record format, such as an OpenAccess (OA) database, allowing for interoperability support between disparate electronic design software tools. The EDA layout software and associated database may generate, store, and/or reformat data according to any number of proprietary and/or standardized formats and protocols.

To design an electronic circuit, a circuit designer may first create a high level behavior descriptions of the electronic circuit device using a high-level hardware design language (HDL). Common examples of HDLs include Verilog and VHDL. The EDA tool may receive a high level behavioral descriptions of the electronic circuit device and translate this high-level design language into netlists of various levels of abstraction representing a netlist of an electronic circuit design, or a set of data records representing a netlist of an electronic circuit design. The process to implement an electronic circuit design may begin with functional design and verification (e.g., using RTL), and then proceeds to physical design and verification.

Simulation may be a method of verifying an electronic circuit design. Simulation dynamically verifies an electronic circuit design by monitoring behaviors of the electronic circuit design with respect to various test stimuli. For many types of the electronic circuit designs, simulation is performed during the electronic circuit design process to ensure that the intended functionality is realized in the final product. During simulation, electrical analyses may be performed on the electronic circuit design to ensure a proper operation of the electronic circuit design, for example, by analyzing power distribution networks to check for potential problems relating to IR drops and electromigration effects. The power distribution networks may be used to distribute power and ground voltages from pad/package locations to circuit blocks in the electronic circuit design. In some embodiments, IR drop may refer to a voltage drop across the power distribution network due to the resistance of interconnects in the power distribution networks. In other words, IR drop is a reduction in voltage that occurs on power supply networks in the electronic circuit design. In some embodiments, electromigration (EM) may be an effect on an electronic circuit design caused by movement of ions in a conductor structure, which over time will reduce the effective ability and reliability of the conductor to conduct current from one part of the electronic circuit design to another, for example, from a power grid to a transistor.

The methods and systems described herein may perform electrical analysis of an electronic circuit design to check and verify the electrical behavior and performance of the electronic circuit design in a two-step process. In the first step, a simulator transient analysis is performed on circuit blocks of the electronic circuit design to obtain a current value through each device path within the circuit block of the electronic circuit design, and using the current value, IR drop and EM problems are examined to get EM-IR drop analysis of each circuit block. In the second step, a simulator transient analysis is performed on a top level circuit of the electronic circuit design and current values generated in the first step in order obtain EMIR drop analysis for the full electronic circuit design such that a circuit designer may debug, analyze and visualize various IR and EM value plots for circuit blocks and top level circuit of the electronic circuit design together or separately.

The methods and systems described herein provides a computationally efficient and cost-effective way to perform electrical analysis (hierarchical EM and IR analysis) of the electronic circuit design using a single integrated user interface ("cockpit") to check for EM and IR violations for circuit blocks and top level circuit of the electronic circuit design together or separately.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein.

FIG. 1 is a schematic diagram illustrating a system 100 for performing electrical analysis on an electronic circuit design, according to an exemplary embodiment. The system 100 for performing electrical analysis may include any number of computing devices to analyze circuit designs such as a client computing device 102, electronic design automation (EDA) tools 104, and a design database 110 comprising one or more electronic circuit designs 108. The client computing device 102, the electronic design automation (EDA) tools 104, and the design database 110 may be connected to each other through a network 106. The examples of the network 106 may include, but are not limited to, private or public LAN, WLAN, MAN, WAN, and the Internet. The network 106 may include both wired and wireless communications according to one or more standards and/or via one or more transport mediums. The communication over the network 106 may be performed in accordance with various communication protocols such as Transmission Control Protocol and Internet Protocol (TCP/IP), User Datagram Protocol (UDP), and IEEE communication protocols. In one example, the network 106 may include wireless communications according to Bluetooth specification sets, or another standard or proprietary wireless communication protocol. In another example, the network 106 may also include communications over a cellular network, including, e.g. a GSM (Global System for Mobile Communications), CDMA (Code Division Multiple Access), EDGE (Enhanced Data for Global Evolution) network.

A client computing device 102 may be any computing device accessed by a circuit designer, and has an user interface. The client computing device 102 may be a computer with a processor/microcontroller and/or any other electronic component that performs one or more operations according to one or more programming instructions. Examples of the client computing device 102 include, but are not limited to, a desktop computer, a laptop, a personal digital assistant (PDA), a tablet computer, or the like. The client computing device 102 enables a circuit designer to access a design database 110 that may store various electronic circuit designs and layouts 108, and pattern libraries. The client computing device 102 may also include a collection of tools that are accessible using the user interface, and various electronic circuit design 108 layout data formats including but not limited to a Graphic Database System ("GDS" or "GDSII") database format, a Manufacturing Electron Beam Exposure System (MEBES) database format, and an Open Artwork System Interchange Standard (OASIS) database format.

A client computing device 102 may be used to operate, interface with, or implement EDA applications or devices, such as the electronic design automation (EDA) tools 104. The client computing device 102 may also include a display device, such as a display monitor, for displaying electronic circuit design 108 analysis results to users, and one or more input devices for the user to provide operational control over the activities of the system, such as a mouse or keyboard to manipulate a pointing object in a graphical user interface (GUI).

In some embodiments, a client computing device 102 may be capable of communicating with one or more servers (not shown) through the network 106 using wired or wireless communication capabilities. The one or more servers may be any computing device comprising a processor and non-transitory machine-readable storage media capable of executing various tasks and processes described herein, and may be accessible to the client computing device 102 via the network 106. The servers may include design tools such as EDA tools 104 that may have access to the design database 110 and may be configured to facilitate the analysis of the electronic circuit design 108. A circuit designer may interact with the design tools through a number of input devices such as by inputting a selection as with a mouse or inputting a request as with a keyboard.

A design database 110 may be a non-transitory machine readable media comprising one or more electronic circuit designs 108. The term "computer readable medium" or "computer usable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as disk drive. Volatile media includes dynamic memory, such as system memory. Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

A design database 110 may include any combination of hardware and/or software that allows for ready access to the electronic circuit design 108 data that is located at a computer readable storage device. For example, a design database 110 may be implemented as computer memory operatively managed by an operating system. The design database 110 could also be implemented as an electronic database system having storage on persistent and/or non-persistent storage to store electronic circuit designs 108 that may include analog designs, mixed-signal electronic designs, and custom digital designs of large sizes. Such electronic circuit designs 108 may include electrical design data that needs to be analyzed by the EDA tools 104. For example, an electronic circuit design 108 may include layout data in the form of higher level specifications, netlists, physical design, or mask information.

A design database 110 storing the electronic circuit design 108 data may include databases having specific data structures for storage of items used by the EDA tools 104 to analyze the electronic circuit designs 108. The EDA tools 104 may operate to transform the electronic circuit design 108 data that represents one type of state to another type of state. For example, design data representative of physical features on an electronic circuit design 108 may be operated upon and transformed into electronic form suitable to be processed by a computer program, stored in a storage medium, or displayed on a display device.

In some embodiments, the electronic circuit designs 108 stored in the design database 110 may correspond to an exemplary integrated circuit (IC) that may be represented in a number of different ways. One representation of the IC maybe by a hierarchical netlist with different levels of hierarchy including macro-blocks or modules, blocks, sub-blocks, and leaf-cells or gates. The levels of hierarchy may often include a top-level or chip level; one or more block-levels, and a cell or leaf level. The cells at the leaf cell level of the hierarchy may include transistors that may make up one or more logical gates.

The electronic circuit designs 108 may also contain a power grid structure that provides power and ground to each electronic and circuit component such as transistors etc. of the electronic circuit design 108. Each electronic circuit design 108 component may have a power pin and a ground pin that may be connected to the power grid structure. A power net may then be defined as a collection of power pins that need to be connected and a ground net may then be defined as a collection of ground pins that need to be connected. The power grid structure may be described in the electronic circuit design 108 layout and is later physically created for use in the electronic circuit design 108 based on the descriptions in the electronic circuit design 108 layout. The power grid structure components may include stripes, rails, and vias which must be of a certain strength, i.e., size, to meet design specifications i.e., minimum specifications that the power grid structure must meet in order to be acceptable for use in the electronic circuit design 108. The power grid components may compete with signal wiring for area on the electronic circuit design 108 layer since they take up area on the electronic circuit design 108 layer that signal wiring could otherwise occupy.

Electronic design automation (EDA) tools 104 may be used by users at the client computing device 102 (and/or the servers) to analyze the electronic circuit design 108 and to generate electrical analysis results. A circuit designer may interact with the EDA tools 104 through a number of input devices of the client computing device 102 such as by inputting a selection as with a mouse or inputting a request as with a keyboard.

During operation, a schematic electronic circuit design 108 is created and simulated using the EDA tools 104 to determine the electrical characteristics of the electronic circuit design 108 to perform the electrical analysis. The characterization of an electrical characteristic or a design parameter may be performed to determine current and voltage characteristics of the created or modified physical data, such as interconnect wires, via or via clusters of the electronic circuit design 108. The interconnect structures may be part of signal and/or power nets. This characterization is not limited to interconnect in that physical electronic circuit design 108 creation and modification of devices may impact device parasitics such as gate to contact capacitance.

Users at a client computing device 102 may first receive design information for an electronic circuit design 108 where the design information comprises full-chip design domain information and a netlist that includes circuit components and nets within the electronic circuit design 108.

The EDA tools 104 may then be executed at the client computing device 102 to provide a top level circuit and circuit blocks of the full-chip design domain information. In some embodiments, the EDA tools 104 may execute one or more instructions for partition of the full-chip design domain information into a top level circuit and multiple circuit blocks. The top level circuit and each of the multiple circuit blocks of the electronic circuit design 108 has an initial top level netlist and an initial block netlist respectively. Each initial block netlist may include information about internal components of the corresponding block whereas an initial top level netlist may include all information about the devices and components of the electronic circuit design 108 expect for information regarding each block internal devices and components.

The EDA tools 104 then generates geometric descriptions such as thickness variation information in a form of a thickness variation file, and information about properties for block instances of the electronic circuit design 108. A RC extraction tool of the EDA tools 104 may then receive geometric descriptions such as thickness variation information and circuit block instance properties to generate command instructions for the RC extraction tool for the circuit block instances, for example, to create circuit block instance definitions in a command language for the RC extraction tool. The circuit block instance definitions are then run as RC extraction jobs to perform the RC analysis on the circuit blocks of the electronic circuit design 108. The RC analysis may be handled for multiple instances of the circuit blocks of the electronic circuit design 108, either sequentially or in parallel. The results of the RC analysis are then collected together, e.g., in SPEF (standard parasitic exchange format) files or DSPF (Detailed Standard Parasitic Format) files that consists of millions of RC elements produced by a process called Parasitic Extraction. In other words, parasitic extraction may be referred to translation, transformation, conversion, or mapping done with mathematical algorithms or models of the geometric description of the block to an equivalent parasitic value such as a resistance, capacitance or inductance. The models may be created through the use of semi-empirical methods that combine models or knowledge of the underlying physics with data provided by various solver(s), simulator(s), or a combination thereof.

After parasitic extraction, a processor then performs a simulation of each of the blocks based at least in part upon the one or more simulation parameters such as temperature and DSPF file by running one or more simulators. The simulator of the EDA tools 104 provides parasitic aware set of voltages and currents at various points in the at least a circuit block portion of the electronic circuit design 108 that are used for electromigration (EM) analysis and IR drop checks in the blocks of the electronic circuit design 108. The current value determined may include peak currents, DC currents, or average currents for one or more device terminals related to or interconnected within the block of the electronic circuit design 108.

Upon determining the EM and IR drop values at the blocks of the electronic circuit design 108, the EDA tools 104 then generates a power grid view of each of the blocks of the electronic circuit design 108 based on the current and voltage values determined for each of the blocks of the electronic circuit design 108. A power grid view for each block generated by the EDA tools 104 represents data corresponding to locations where the blocks are connected to the top level circuit of the electronic circuit design 108. A boundary between the blocks and top level circuit may be determined using the power grid view of each of the blocks.

The EDA tools 104 then generates a final block netlist of each circuit block. The final block netlist generated by the EDA tools 104 for each circuit block does not include information corresponding to transistors in each of the one or more circuit blocks as the current values such as peak currents, DC currents, or average currents for one or more device terminals related to or interconnected within the each block of the electronic circuit design 108 has already been determined during the simulation of blocks.

The EDA tools 104 may then perform simulation of the electronic circuit design 108 using a simulator based a current value for each transistor in each of the one or more circuit blocks, a final block netlist of each circuit block, and an top level netlist of a top level circuit that may include a record of a plurality of circuit devices and a plurality of nets interconnecting the plurality of circuit devices within top level circuit of the electronic circuit design 108 and one or more interface nodes that are selected within the electronic circuit design 108 that connects the top level circuit to blocks. In some embodiments, a current value for each transistor in each of the one or more circuit blocks is directly attached to the top level netlist of a top level. In such a case, the EDA tools 104 may then perform simulation of the electronic circuit design 108 using a simulator based on a final block netlist of each circuit block, and a record of a plurality of circuit devices and a plurality of nets interconnecting the plurality of circuit devices within top level circuit of the electronic circuit design 108 and one or more interface nodes that are selected within the electronic circuit design 108 that connects the top level circuit to blocks. The simulator of the EDA tools 104 then provides simulation results that are used for electromigration (EM) analysis and IR drop checks in the top level circuit of the electronic circuit design 108. A circuit designer may then debug, analyze and visualize various IR and EM value plots for circuit blocks and top level circuit of the electronic circuit design together or separately on a client computing device 102.

Figure 2:
FIG. 2 is a functional flow diagram depicting a computer-implemented method for performing electrical analysis on an electronic circuit design, according to an exemplary embodiment.

FIG. 2 is a functional flow diagram 200 depicting a computer-implemented method for performing electrical analysis on an electronic circuit design, such as an exemplary integrated circuit (IC), according to an exemplary embodiment. The computer-implemented method is executed by a computer coupled to the non-transitory machine readable media storing the electronic circuit design and may include a single processor or a plurality of processors that execute the steps for performing electrical analysis on the electronic circuit design. The processor may include suitable logic, circuitry, and interfaces that are operable to execute one or more instructions for performing electrical analysis on the circuit design. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. The processor may also include a Graphics Processing Unit (GPU) that executes the set of instructions to perform one or more processing operations. The processor may further include a software-based graphic design environment executing software programs to assist a circuit design in analyzing and simulating the electronic circuit designs.

A processor obtains the electronic circuit design such as IC to be analyzed from a non-transitory machine readable media. The IC maybe represented with different levels of hierarchy including macro-blocks or modules, blocks, sub-blocks, and leaf-cells or gates. The levels of hierarchy of the IC may also be represented as a top-level/chip level and one or more block-levels. In some embodiments, the IC hierarchy may be traversed from a top design level to bottom design levels. In some embodiments, the IC design may be a hierarchical electronic circuit design information structure or file stored in the non-transitory machine readable media where the cells at the block-level/block of the hierarchy may include devices such as transistors that may make up one or more logical gates.

At step 202, a processor analyzes each of one or more blocks of the IC to obtain capacitance and resistance for specific geometric descriptions of conductors of the power grid in the each of the one or more blocks to create an estimation of capacitance and resistance using a process called as parasitic resistance and capacitance (RC) extraction. An RC analysis tool comprising software and/or hardware may perform RC extraction that translates a geometric description of conductor and insulator objects, or other shapes described in each of one or more blocks of an IC design file or database, to associated parasitic capacitance values. The capacitance values may include total capacitance of a single conductor, defined as the source conductor, relative to neighboring conductors or separate coupling capacitance between the source and one or more neighboring conductors.

In some embodiments, any suitable tool perform the RC extraction where the RC analysis tool accesses each block design data from the design database to perform the extraction operations. In some embodiments, a model-based RC extraction is performed using models. One example tool used to perform model-based RC extraction may utilize process models from the IC design file to perform the RC extraction operations. The results of performing RC extraction in an initial block netlist displayed to a circuit designer on a client computing device, and may consist of millions of RC elements produced by parasitic extraction process that can be stored in any suitable format or non-transitory machine readable medium. For example, the analysis results can be stored in the DSPF (Detailed Standard Parasitic Format) or SPEF (Standard Parasitic Exchange Format) that may consist of millions of RC elements. In some embodiments, a netlist file in DSPF format for each functional block may include a plurality of records for a plurality of cells and a plurality of nets/wires that interconnect the plurality of cells in each block. The plurality of records for the plurality of cells may also include the location information of the plurality of cells and/or the plurality of nets in the die of each block of the IC. In the present embodiment, an initial block netlist file in DSPF format may include a record of a plurality of circuit devices and a plurality of nets interconnecting the plurality of circuit devices within each block of the IC. The initial block netlist file in DSPF format may also describe each net and provides information about a port to which it is connected for each instance.

At step 204, the processor performs a simulator transient analysis upon each block design. The processor may execute circuit simulators to perform the simulator transient analysis The circuit simulators may read in an initial block netlist code to perform the electrical analysis. In other words, circuit simulators may operate on an initial block netlist file that describes a circuit block of a circuit design and specifies the simulation conditions. For example, a block circuit model may include model elements such as transistors, parameters (e.g., process/device), connectivity (e.g., topology), and operating and simulation conditions that include model inputs for a simulation interval (e.g., waveform profiles) and frequency values of operation. Various circuit simulators such as the Simulation Program with Integrated Circuit Emphasis (SPICE) circuit simulators may be utilized for analyzing and verifying circuit designs. SPICE is a circuit simulation program for nonlinear dc, nonlinear transient, and linear AC analyses, and is used to model devices of an IC design.

In some embodiments, during a simulation operation, a circuit simulator may receive an input file that includes an initial block netlist file description that may include embedded code segments written in programming languages that include scripting operations for generating executable netlist code. The circuit simulator may include a reader that reads in the input file, a parser that determines the netlist elements by extracting them from the input file and converting them into tokens, and a processor that simulates the IC based on extracted elements. The circuit simulator may then create a system of equations for the IC using methods such as Modified Nodal Analysis (MNA). The equations may be solved by various analysis techniques such as DC analysis, AC small-signal analysis, transient analysis, Pole-Zero analysis, and so on. The equations may represent, for example, IC node voltages, currents, transconductance, and other operating conditions or parameters of the blocks of the IC.

In some embodiments, a suitable circuit simulator may apply a simulation technique on an initial block netlist to compute a current value (such as average current value and peak current value) for power and/or signal nets of each of the transistors in the block. For example, SPICE may be utilized to perform simulation to concurrently obtain the current value through each transistor device path on a power network of interest. The current values obtained for each transistor for each of the blocks is then stored in a database. The simulation results such as current value determined for the power and/or signal nets of each transistor in each of the one or more circuit blocks are then used to perform voltage (IR) drop and EM analysis on each circuit block circuit components, and the determined EM and IR drop values are stored into a database.

At step 206, the processor may generate a power grid view (PGV) for each circuit block. The processor may issue a command to generate the PGV of each circuit block based on current and voltage drop values in each circuit block that represents a corresponding block data in a PGV format. The PGV of each circuit block circuit may include power grid regions which have different power grid densities. The difference in grid densities of grid regions, for example, may be indicative of an expected difference in power consumption. For example, denser power grids may be designed into regions that are expected to have higher power consumption. In some embodiments, the PGV of each circuit block circuit may include data corresponding to locations where each of the one or more circuit blocks is connected to the top level circuit of the IC. In some embodiments, the PGV of each circuit block circuit may further include data related to each circuit block port shapes.

In some embodiments, the processor may generate a final block level netlist of each of the one or more circuit blocks. The final block level netlist of each of the one or more circuit blocks complied by the processor may not include data corresponding to transistors in each of the one or more circuit blocks as current values for each transistor is already obtained from each block during simulation of the blocks.

At step 208, the processor may execute a top level circuit extraction tool to extract a top level circuit of the IC. The top level circuit extraction tool as used herein is meant to encompass software implementations, hardware implementations, or a combination of hardware and software implementations. During operation, when the top level circuit extraction tool while extracting the top level circuit design of the IC reaches a boundary of one or more blocks, the extraction operation of the top level circuit extraction tool, the processor may stop the extraction operation. The top level circuit extraction tool will then check location of a node in the PGV view of each of the blocks in order to determine nodes in the top level circuit design that connect to each of the circuit blocks. Upon determining the nodes in the PGV where the top level circuit design is to be connected to the circuit blocks, the top level circuit extraction tool then may connect the top level circuit design to the determined nodes in the PGV of each of the blocks. The determined nodes are called as interface nodes that extend from the top level circuit of the circuit design and connect to the one or more circuit blocks.

The processor may compile an initial top level netlist file in DSPF format comprising a record of a plurality of circuit devices and a plurality of nets interconnecting the plurality of circuit devices within top level circuit of the IC and the one or more interface nodes. In some embodiments, top level circuit design data of the IC may already be extracted and stored in a non-transitory machine readable media. The processor may receive a top level circuit design data of the IC from the non-transitory machine readable media. The top level circuit design information received by the processor may be used in any suitable format for processing. In some embodiments, a format of the top level circuit design information may optionally be converted from a first design format with connectivity information to a second design format with shape information to facilitate processing. For example, the top level circuit design may be originally in the Library Exchange Format/Design Exchange (LEF/DEF) format, but is to be converted to the Graphic Data System (GDS) format prior to being used.

At step 210, the processor may perform a simulator transient analysis upon a top level circuit design using a simulation tool. In order to perform the simulation of the top level circuit design, the processor may retrieve from the database current values determined while simulation of each of the blocks, and may attach to the top level circuit so that blocks are not re-simulated when the processor simulates the top level. Subsequently, the processor may perform a simulator transient analysis on a top level netlist of a top level circuit comprising a record of a plurality of circuit devices and a plurality of nets interconnecting the plurality of circuit devices within top level circuit of the IC and one or more interface nodes of the IC to generate data for EM or IR drop analysis. In some embodiments, the current values determined while simulation of each of the blocks are retrieved from the database, and attached to the top level netlist of a top level circuit comprising a record of devices within top level circuit of the IC and one or more interface nodes of the IC. The processor may utilize any suitable approach simulate the top level circuit design. For example, a brute force approach can be taken to simulate a top level netlist to obtain the necessary IC values. In some embodiments, the simulation results are then used to perform voltage (IR) drop and EM analysis on top level circuit components of the net, and the determined EM and IR drop values are stored into a database.

At step 212, a processor may display EM and IR plots for circuit blocks and top level circuit of the IC on a display unit having a graphical user interface (GUI) of a client computing device. The display unit may include a cathode ray tube (CRT) display, liquid crystal display (LCD), plasma, or light emitting diode (LED) display. In some embodiments, a circuit designer may debug, analyze and visualize various IR and EM value plots for circuit blocks and top level circuit of the IC together or separately on the GUI of the display unit of the client computing device.

Figure 3A:
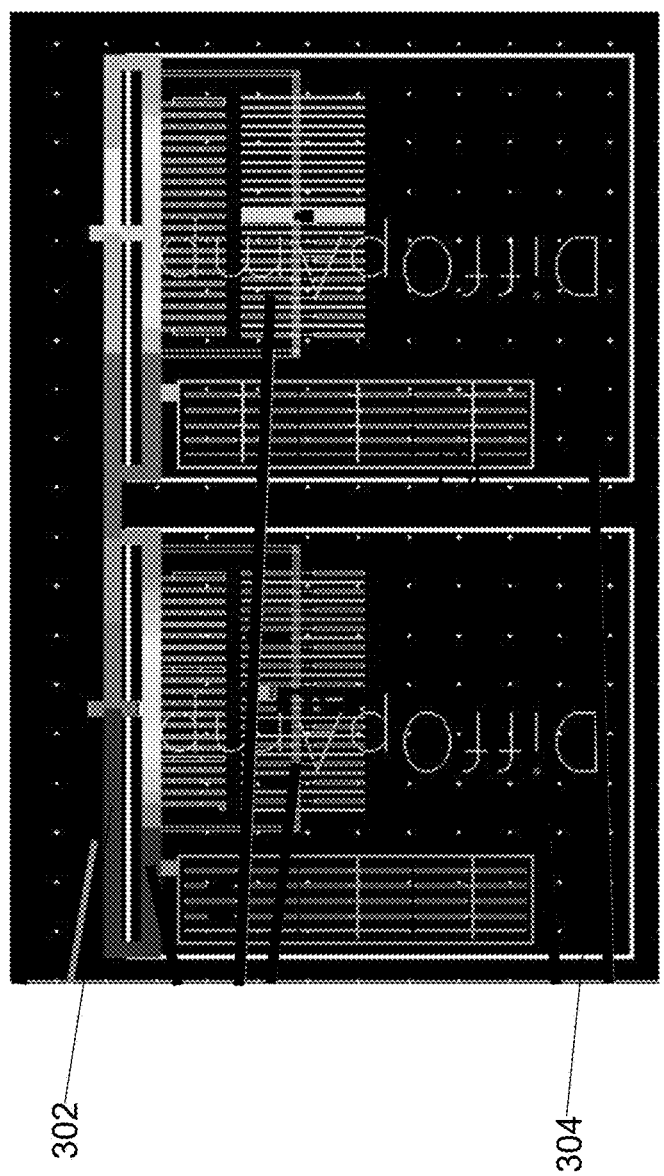
FIG. 3A is a schematic diagram showing an electronic circuit design where a top level circuit and one or more circuit blocks are integrated, according to an exemplary embodiment.

FIG. 3A is a schematic diagram showing an electronic circuit design where a top level circuit 302 and one or more circuit blocks 304 are integrated, according to an exemplary embodiment. The electronic circuit design may include analog designs, analog/mixed-signal (AMS) designs, and custom digital designs of large sizes. A top level circuit design 302 may be used for design activities at a full electronic circuit chip level, e.g., geometry extraction and block locations. A couple of the blocks shown in the top level circuit design are each represented by 304. The top level circuit design 302 may correspond to a coordinate system that is different from a coordinate system used for a circuit block design 304. In particular, a top level circuit design 302 corresponds to a full electronic circuit chip level coordinate system, e.g., to specify location(s) of the blocks. Therefore, blocks are often transformed into their place within the full electronic circuit design. In contrast, a circuit block design 304 may operate with and utilize local circuit block coordinates. In some embodiments, a processor may identify information in an electronic circuit design from a top level circuit design 302 and may convert that information to a framework usable by a circuit designer at a circuit block 304. For example, the processor this can translate from a coordinate space used at a full electronic circuit chip level to a coordinate space used locally at a circuit block 304.

Figure 3B:
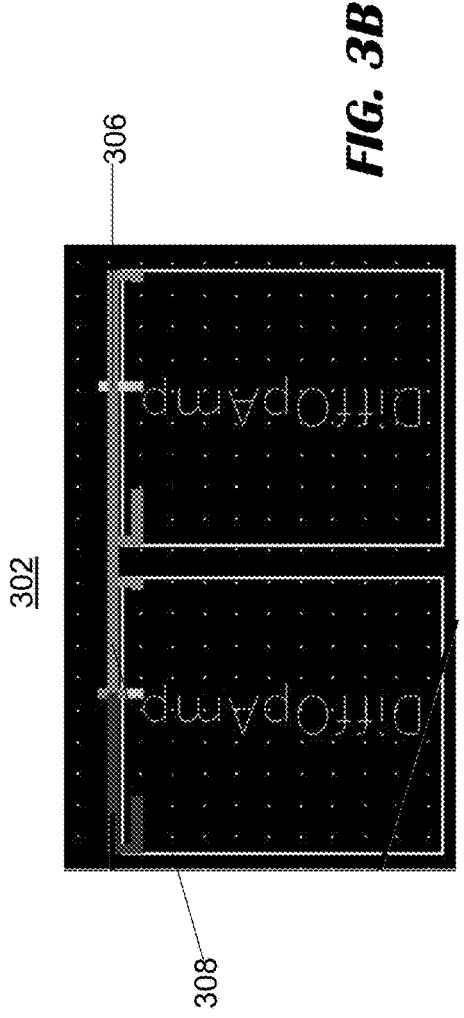
FIG. 3B is a schematic diagram showing a top level circuit of an electronic circuit design, according to an exemplary embodiment.
Figure 3C:
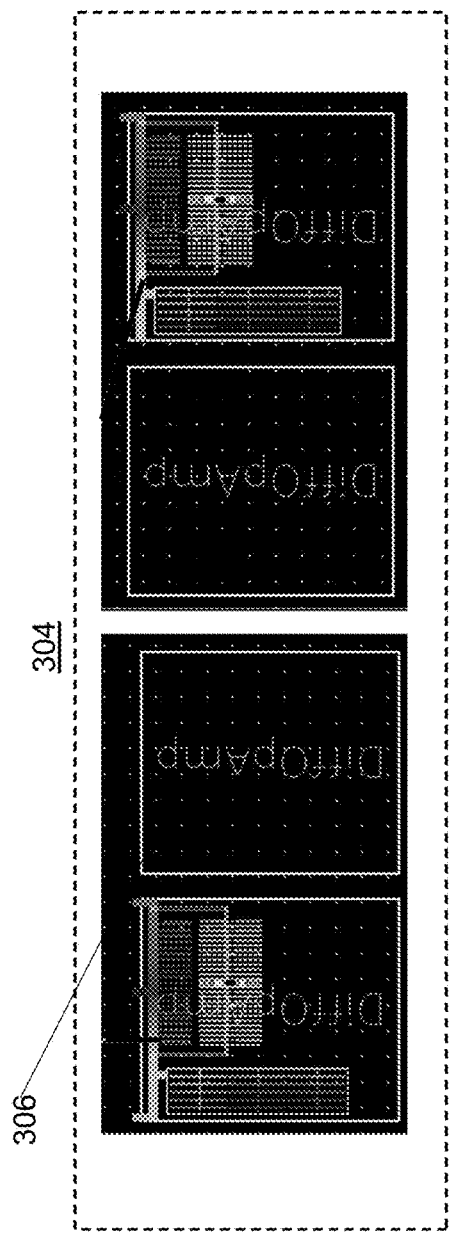
FIG. 3C is a schematic diagram showing one or more circuit blocks of an electronic circuit design, according to an exemplary embodiment.

In some embodiments, the processor may represent an electronic circuit design in a number of different ways such as a flattened chip or a tree hierarchy of different levels of electronic circuits. A representation of the electronic circuit design is by a hierarchical netlist with different levels of hierarchy including a top level circuit with one or more types of partitions (e.g., macro-blocks, modules or partitions, blocks, sub-blocks, and leaf-cells or gates) at lower circuit blocks instantiated therein. For instance, a computer may partition an electronic circuit design into a hierarchy of a top level circuit 302 (as shown in FIG. 3B) and one or more circuit blocks 304 (as shown in FIG. 3C).

Each of the one or more circuit blocks 304 comprises a block netlist that may include a record of a plurality of circuit devices and a plurality of nets interconnecting the plurality of circuit devices within a block boundary 306. The top level circuit 302 has a top netlist that may include a record of a plurality of circuit devices and a plurality of nets interconnecting the plurality of circuit devices within the top level circuit 302 of the electronic circuit design and an interface node 308 that connects the top level circuit 302 to the one or more circuit blocks 304.

In an embodiment, a computer may perform simulator transient analysis upon the top level circuit design 302. The computer may perform the simulator transient analysis using circuit simulators that read in a top netlist code to perform the electrical analysis (EM-IR drop analysis). In an embodiment, a simulator transient analysis is also performed by a computer upon the one or more circuit block designs 304. The simulator transient analysis may be performed using circuit simulators executed by the processor that reads on a block netlist code to perform the electrical analysis (EM-IR drop analysis). The EM-IR drop analysis of the electronic circuit design performed by the methods and the systems described herein is such that a circuit designer may debug, analyze and visualize various IR and EM value plots for each circuit block and top level circuit of the electronic circuit design together or separately.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for performing electromigration and voltage drop verification of a circuit design of an electronic circuit, the method comprising:
receiving, by a computer, design data for the circuit design from a non-transitory machine-readable media, wherein the design data comprises full-chip information for the circuit design having one or more circuit blocks and a top level circuit;
simulating, by the computer, an initial block netlist of each of the one or more circuit blocks to determine current values for respective power and signal nets associated with a plurality of transistors in each of the one or more circuit blocks, wherein each respective initial block netlist comprises a plurality of records of a plurality of transistors and a plurality of nets interconnecting the plurality of transistors within each circuit block;
generating, by the computer, a block current file for each of the one or more circuit blocks, wherein a respective block current file for a circuit block contains database records indicating the current values for the respective power and signal nets associated with the plurality of transistors in the respective circuit block;
determining, by the computer, voltage drop values across the respective power and signal nets for the plurality of transistors in the respective circuit block based upon the current values determined for the respective power and signal nets for the plurality of transistors in the respective circuit block;

generating, by the computer, a power grid view file for each of the one or more circuit blocks based upon the current values and voltage values across the power and signal nets associated with the plurality of transistors in the respective circuit block;

in response to the computer receiving one or more instructions to simulate the top level circuit:

determining, by the computer, a plurality of interface nodes connecting the circuit blocks to the top level circuit based upon the respective power grid file;

rendering, by the computer, a graphical user interface (GUI) displaying a top level circuit simulation based on a top level netlist of the top level circuit, the plurality of interface nodes connecting the circuit blocks to the top level circuit, and the block current files for the circuit blocks; and causing, by the computer, a fabrication of the electronic circuit.

2. The computer-implemented method of claim 1, further comprising:

partitioning, by the computer, the circuit design into a hierarchy of the top level circuit and the one or more circuit blocks.

3. The computer-implemented method of claim 1, further comprising:

generating, by the computer, a final block netlist of each of the one or more circuit blocks, wherein the final block netlist of each of the one or more circuit blocks comprises circuit devices other than the plurality of transistors.

4. The computer-implemented method of claim 3, further comprising:

simulating, by the computer, the circuit design based on the top level netlist of the top level circuit and the plurality of interface nodes connecting the circuit blocks to the top level circuit, the block current files for the circuit blocks, and the final block netlist of each of the one or more circuit blocks.

5. The computer-implemented method of claim 1, wherein each of the plurality of records of the plurality of transistors in each respective initial block netlist comprises a location of each transistor of the plurality of transistors within the respective circuit block.

6. The computer-implemented method of claim 1, further comprising:

determining, by the computer, the electromigration and the voltage drop across each circuit block based on the block current files for the circuit blocks and the voltage drop values across the respective power and signal nets for the plurality of transistors in each circuit block.

7. The computer-implemented method of claim 1, wherein the top level netlist of the top level circuit and the plurality of interface nodes comprises a plurality of records of a plurality of transistors and a plurality of nets interconnecting the plurality of transistors within the top level circuit and the plurality of interface nodes.

8. The computer-implemented method of claim 1, further comprising:

determining, by the computer, the plurality of transistors and the plurality of nets interconnecting the plurality of transistors within the top level circuit based upon the power grid view file for each of the one or more circuit blocks.

9. The computer-implemented method of claim 1, wherein the plurality of interface nodes extends from the top level circuit to connect with the one or more circuit blocks.

10. The computer-implemented method of claim 1, further comprising:

attaching, by the computer, the block current files for the circuit blocks to the top level netlist to simulate the circuit design.

11. A system for performing electromigration and voltage drop verification of a circuit design of an electronic circuit, the system comprising:

a non-transitory machine-readable media configured to store the circuit design; and a computer coupled to the non-transitory machine readable media storing the circuit design and comprising a processor configured to:

receive design data for the circuit design from the non-transitory machine-readable media, wherein the design data comprises full-chip information for the circuit design having one or more circuit blocks and a top level circuit, and a plurality of interface nodes connecting the top level circuit to the one or more circuit blocks;

simulate an initial block netlist of each of the one or more circuit blocks to determine current values for respective power and signal nets associated with a plurality of transistors in each of the one or more circuit blocks, wherein each respective initial block netlist comprises a plurality of records of a plurality of transistors and a plurality of nets interconnecting the plurality of transistors within each circuit block;

generate a block current file for each of the one or more circuit blocks, wherein a respective block current file for a circuit block contains database records indicating the current values for the respective power and signal nets associated with the plurality of transistors in the respective circuit block;

determine voltage drop values across the respective power and signal nets for the plurality of transistors in the respective circuit block based upon the current values determined for the respective power and signal nets for the plurality of transistors in the respective circuit block;

generate a power grid view file for each of the one or more circuit blocks based upon the current values and voltage values across the power and signal nets associated with the plurality of transistors in the respective circuit block;

in response to the computer receiving one or more instructions to simulate the top level circuit:

determine a plurality of interface nodes connecting the circuit blocks to the top level circuit based upon the respective power grid file;

render a graphical user interface (GUI) displaying a top level circuit simulation based on a top level netlist of the top level circuit, the plurality of interface nodes connecting the circuit blocks to the top level circuit, and the block current files for the circuit blocks; and cause a fabrication of the electronic circuit.

12. The system of claim 11, wherein the computer is further configured to:

partition the circuit design into a hierarchy of the top level circuit and the one or more circuit blocks.

13. The system of claim 11, wherein the computer is further configured to:

generate a final block netlist of each of the one or more circuit blocks, wherein the final block netlist of each of the one or more circuit blocks comprises circuit devices other than the plurality of transistors.

14. The system of claim 13, wherein the computer is further configured to:
   simulate the circuit design based on the top level netlist of the top level circuit and the plurality of interface nodes connecting the circuit blocks to the top level circuit, the block current files for the circuit blocks, and the final block netlist of each of the one or more circuit blocks.

15. The system of claim 11, wherein each of the plurality of records of the plurality of transistors in each respective initial block netlist comprises a location of each transistor of the plurality of transistors within the respective circuit block.

16. The system of claim 11, wherein the computer is further configured to:
   determine the electromigration and the voltage drop across each circuit block based on the block current files for the circuit blocks and the voltage drop values across the respective power and signal nets for the plurality of transistors in each circuit block.

17. The system of claim 11, wherein the top level netlist of the top level circuit and the plurality of interface nodes comprises a plurality of records of a plurality of transistors and a plurality of nets interconnecting the plurality of transistors within the top level circuit and the plurality of interface nodes.

18. The system of claim 11, wherein the computer is further configured to:
   determine the plurality of transistors and the plurality of nets interconnecting the plurality of transistors within the top level circuit based upon the power grid view file for each of the one or more circuit blocks.

19. The system of claim 11, wherein the plurality of interface nodes extends from the top level circuit to connect with the one or more circuit blocks.

20. The system of claim 11, wherein the computer is further configured to:
   attach the block current files for the circuit blocks to the top level netlist to simulate the circuit design.

* * * * *